United States Patent
Murakami et al.

(10) Patent No.: US 7,793,983 B2
(45) Date of Patent: Sep. 14, 2010

(54) SEAT BELT RETRACTOR AND SEAT BELT APPARATUS

(75) Inventors: Daisuke Murakami, Tokyo (JP); Koji Inuzuka, Tokyo (JP); Koji Tanaka, Tokyo (JP); Masato Takao, Tokyo (JP)

(73) Assignee: Takata Corporation, Tokyo (JP)

( * ) Notice: Subject to any disclaimer, the term of this patent is extended or adjusted under 35 U.S.C. 154(b) by 200 days.

(21) Appl. No.: 12/216,022

(22) Filed: Jun. 27, 2008

(65) Prior Publication Data

US 2009/0051156 A1 Feb. 26, 2009

(30) Foreign Application Priority Data

Aug. 24, 2007 (JP) ............... 2007-217908

(51) Int. Cl.
*B60R 22/34* (2006.01)
(52) U.S. Cl. .................... 280/807; 242/390.8
(58) Field of Classification Search ........... 280/807; 242/390.8; 297/474, 475
See application file for complete search history.

(56) References Cited

U.S. PATENT DOCUMENTS

| | | | | |
|---|---|---|---|---|
| 4,489,804 A | * | 12/1984 | Kamijo | 180/268 |
| 4,669,680 A | * | 6/1987 | Nishimura et al. | 242/375.3 |
| 4,787,569 A | * | 11/1988 | Kanada et al. | 242/371 |
| 4,896,844 A | * | 1/1990 | Gavagan et al. | 280/807 |
| 5,765,774 A | | 6/1998 | Maekawa et al. | |
| 6,447,012 B2 | | 9/2002 | Peter et al. | |
| 6,827,308 B2 | * | 12/2004 | Fujii et al. | 242/390.9 |
| 6,908,112 B2 | * | 6/2005 | Yano et al. | 280/805 |
| 7,080,800 B2 | * | 7/2006 | Fujii et al. | 242/390.9 |
| 7,673,905 B2 | * | 3/2010 | Fujii et al. | 280/806 |
| 2003/0209900 A1 | * | 11/2003 | Tobata | 280/807 |
| 2006/0273212 A1 | * | 12/2006 | Mori et al. | 242/390.8 |
| 2007/0114775 A1 | | 5/2007 | Inuzuka et al. | |
| 2008/0174098 A1 | * | 7/2008 | Takao et al. | 280/807 |
| 2008/0231036 A1 | * | 9/2008 | Takao et al. | 280/807 |
| 2008/0238076 A1 | * | 10/2008 | Takao et al. | 280/807 |
| 2009/0058063 A1 | * | 3/2009 | Takao et al. | 280/807 |

FOREIGN PATENT DOCUMENTS

| | | |
|---|---|---|
| JP | 8-40204 | 2/1996 |
| JP | 9-272401 | 10/1997 |
| JP | 2000-135969 | 5/2000 |
| JP | 2001-130377 | 5/2001 |
| JP | 2001-187561 | 7/2001 |
| JP | 2001-199309 | 7/2001 |
| JP | 2007-145079 | 6/2007 |

\* cited by examiner

*Primary Examiner*—Paul N Dickson
*Assistant Examiner*—Drew Brown
(74) *Attorney, Agent, or Firm*—Foley & Lardner LLP (57) ABSTRACT

A seat belt retractor including an integral electronic control unit (ECU). The ECU is detachably installed between lower edges of respective both side walls of a frame. Further, a motor is detachably fixed to a lower surface of a case of the ECU. Since the ECU is disposed between the frame and the motor, the ECU can be protected from an external force by means of the frame and the motor.

10 Claims, 5 Drawing Sheets

SEAT BELT RETRACTOR AND SEAT BELT APPARATUS

BACKGROUND

The present application relates to a technical field of a seat belt retractor that carries out at least one of retracting operation and withdrawing operation for a seat belt by rotating a spool with an electric motor, and a seat belt apparatus provided with the same, and particularly to a technical field of a seat belt retractor where the electric motor is controlled with an electronic control unit (ECU), and the seat belt apparatus using the same.

Generally, a seat belt apparatus mounted on a motor vehicle such as an automobile or the like is configured to restrain an occupant in the event of an emergency, such as a collision. Such a seat belt apparatus is provided with a seat belt retractor for retracting the seat belt. The seat belt is wound on a spool when the seat belt is not in use, and is withdrawn and worn by the occupant when used for protection. A locking mechanism of the seat belt retractor is activated in the above-described emergency and a rotation of the spool in a seat belt-withdrawing direction is blocked, and thereby prohibiting the withdrawal of the seat belt and thereby, restraining the occupant in the emergency.

Traditionally, a seat belt apparatus is provided with a seat belt retractor for carrying out retracting operation for a seat belt by controlling the rotation of a spool with an electric motor.

It is desirable to provide a seat belt retractor capable of protecting an electronic control unit integrally provided in a seat belt retractor from an external force, suppressing noise caused by the electronic control unit, to be affected to any of other electronic parts, and improving assembling workability by compactly forming the seat belt retractor, and a seat belt apparatus using the same.

SUMMARY

A disclosed embodiment includes a seat belt retractor comprising: a frame that includes a back plate and both side walls protruding from both side edges of the back plate; a spool for winding a seat belt while being supported by the frame for rotation; a motor for rotating the spool; and an electronic control unit for drive-controlling the motor.

The electronic control unit is detachably installed between upper edges or lower edges of the respective both side walls of the frame, and the motor is detachably fixed to an upper surface or a lower surface of the electronic control unit.

A disclosed embodiment includes a seat belt retractor comprising: a frame including a back plate and both side walls protruding from both side edges of the back plate; a spool for winding a seat belt while being supported by the frame for rotation; a motor for rotating the spool; and an electronic control unit for drive-controlling the motor.

The motor is detachably installed between upper edges of the respective side walls of the frame, and the electronic control unit is detachably fixed to an upper surface of the motor.

BRIEF DESCRIPTION OF THE DRAWINGS

These and other features, aspects, and advantages of the present invention will become apparent from the following description, appended claims, and the accompanying exemplary embodiments shown in the drawings which are briefly described below.

DETAILED DESCRIPTION

Referring generally to the FIGURES, a seat belt retractor is shown including: a frame with a back plate and both side walls protruding from both side edges of the back plate; a spool for winding a seat belt while being supported with the frame for rotation; a motor for rotating the spool; and an electronic control unit for drive-controlling the motor, the electronic control unit is detachably installed between upper edges or lower edges of the respective both side walls of the frame, and the motor is detachably fixed to an upper surface or a lower surface of the electronic control unit.

The seat belt retractor includes: a frame with a back plate and both side walls protruding from both side edges of the back plate; a spool for winding a seat belt while being supported with the frame for rotation; a motor for rotating the spool; and an electronic control unit for drive-controlling the motor, the motor is detachably installed between upper edges of the respective side walls of the frame, and the electronic control unit is detachably fixed to an upper surface of the motor. The seat belt retractor is disposed in a space inside a vehicle body member.

A seat belt apparatus is provided including: a seat belt retractor performing at least one of retracting operation and withdrawing operation for a seat belt by rotating a spool by means of a motor; a tongue slidably supported by the seat belt that is withdrawn from the seat belt retractor; and a buckle with which the tongue is disengageably engaged, and restraining an occupant with the seat belt with the tongue being engaged with the buckle According to the seat belt retractor described herein, since an electronic control unit is disposed between the frame and the motor, the electronic control unit can be protected from an external force by the frame and the motor.

Further, since both of the motor and the electronic control unit are disposed above and below both side walls of the frame, dead spaces of both side walls of the frame in upper and lower directions can effectively be utilized for disposing the motor and the electronic control unit.

Furthermore, since the electronic control unit is installed between upper edges or lower edges of the respective both side walls of the frame, the electronic control unit can be utilized as a reinforcing member for the frame in comparison with the case that the electronic control unit is provided on one of both side walls. Thereby, the strength of the frame can be secured without increasing the wall thickness of the frame or forming the structural size of the frame to be complicated and enlarged. Even when the electronic control unit is integrally assembled with the seat belt retractor, the seat belt retractor can be formed to be lightweight and compact, and workability for assembling the seat belt retractor into a limited narrow space inside a motor vehicle such as an inner space of a center pillar or the like can be improved.

Since both of the electronic control unit and the motor are provided at an upper portion in relation to a spool that is supported by the frame, the electronic control unit and the motor can be placed closer to a vehicle body-attaching position of the seat belt retractor at an upper portion thereof for attaching the seat belt retractor to the vehicle body. Even when the electronic control unit and the motor are integrally provided in the seat belt retractor, not only each weight of the electronic control unit and the motor is dispersed to both side walls of the frame, but also the same can be dispersed to the vehicle body-attaching position side at the upper portion other than both side walls.

Further, since the electronic control unit is surrounded by the back plate, both side walls of the frame, and the vehicle body-attaching position side at the upper portion, the electronic control unit can be protected from the external force through the back plate, both side walls, and the vehicle body-attaching position side at the upper portion of the frame.

Furthermore, since the motor and the electronic control unit are integrally formed, an electric connection between the electronic control unit and the motor is further simplified and the length of wiring therefore can be reduced, as well as the number of assembling man-hours for assembling the motor and the electronic control unit can be reduced.

Since both of the motor and the electronic control unit being integrally provided are covered with a vehicle body member such as the center pillar or the like, noise can be shielded by the vehicle body member and the back plate of the frame even when the noise is generated from the motor and the electronic control unit by the electronic control unit being activated at the time when the motor is driven. Thereby, there is no possibility that the noise is leaked to the outside from the inner space of the vehicle body member.

On the other hand, since the seat belt retractor is formed to be compact and is able to be assembled into a narrow space such as the inner space of the center pillar or the like, an inner space of a vehicle interior of the motor vehicle can be prevented from being wastefully occupied by the seat belt retractor even when the seat belt retractor provided with the motor and the electronic control unit is provided in the motor vehicle. Thereby, a favorable restraining capability for an occupant can be obtained by a belt tension control for the seat belt by the motor, while securing comfort of the occupant in the vehicle interior.

An object is to provide a seat belt retractor capable of protecting an electronic control unit integrally provided in a seat belt retractor from an external force, suppressing noise caused by the electronic control unit, to be affected to any of other electronic parts, and improving assembling workability by compactly forming the seat belt retractor, and a seat belt apparatus using the same.

In order to solve the above-described problems, a seat belt retractor is characterized in that in the seat belt retractor includes: a frame including a back plate and both side walls protruding from both side edges of the back plate; a spool for winding a seat belt while being supported by the frame for rotation; a motor for rotating the spool; and an electronic control unit for drive-controlling the motor, the electronic control unit is detachably installed between upper edges or lower edges of the respective both side walls of the frame, and the motor is detachably fixed to an upper surface or a lower surface of the electronic control unit.

Further, a seat belt retractor is characterized by at least including: a frame including a back plate and both side walls protruding from both side edges of the back plate; a spool for winding a seat belt while being supported by the frame for rotation; a motor for rotating the spool; and an electronic control unit for drive-controlling the motor, the motor is detachably installed between upper edges of the respective side walls of the frame, and the electronic control unit is detachably fixed to an upper surface of the motor.

Furthermore, the seat belt retractor is characterized in that the seat belt retractor is disposed in a space inside a vehicle body member.

Moreover, a seat belt apparatus is characterized in that in a seat belt apparatus at least including: a seat belt retractor performing at least one of retracting operation and withdrawing operation for a seat belt by rotating a spool by a motor; a tongue slidably supported by the seat belt that is withdrawn from the seat belt retractor; and a buckle with which the tongue is disengageably engaged, and restraining an occupant with the seat belt by the tongue being engaged with the buckle.

According to the seat belt retractor disclosed herein, since an electronic control unit is disposed between the frame and the motor, the electronic control unit can be protected from an external force by the frame and the motor.

Further, since both of the motor and the electronic control unit are disposed above and below both side walls of the frame, dead spaces of both side walls of the frame in upper and lower directions can effectively be utilized for disposing the motor and the electronic control unit.

Furthermore, since the electronic control unit is installed between upper edges or lower edges of the respective both side walls of the frame, the electronic control unit can be utilized as a reinforcing member for the frame in comparison with the case that the electronic control unit is provided on one of both side walls. Thereby, the strength of the frame can be secured without increasing the wall thickness of the frame or forming the structural size of the frame to be complicated and enlarged. Consequently, even when the electronic control unit is integrally assembled with the seat belt retractor, the seat belt retractor can be formed to be lightweight and compact, and workability for assembling the seat belt retractor into a limited narrow space inside a motor vehicle such as an inner space of a center pillar or the like can be improved.

Moreover, since both of the electronic control unit and the motor are provided at an upper portion in relation to a spool that is supported by the frame, the electronic control unit and the motor can be placed closer to a vehicle body-attaching position of the seat belt retractor at an upper portion thereof for attaching the seat belt retractor to the vehicle body. Thereby, even when the electronic control unit and the motor are integrally provided in the seat belt retractor, not only each weight of the electronic control unit and the motor is dispersed to both side walls of the frame, but also the same can be dispersed to the vehicle body-attaching position side at the upper portion other than both side walls.

Further, since the electronic control unit is surrounded by the back plate, both side walls of the frame, and the vehicle body-attaching position side at the upper portion, the electronic control unit can be protected from the external force by the back plate, both side walls, and the vehicle body-attaching position side at the upper portion of the frame.

Furthermore, since the motor and the electronic control unit are integrally formed, an electric connection between the electronic control unit and the motor is further simplified and a length of wiring therefore can be reduced, as well as the number of assembling man-hours for assembling the motor and the electronic control unit can be reduced.

Moreover, since both of the motor and the electronic control unit being integrally provided are covered with a vehicle body member such as the center pillar or the like, noise can be shielded by the vehicle body member and the back plate of the frame even when the noise is generated from the motor and the electronic control unit by the electronic control unit being activated at the time when the motor is driven. Thereby, there is no possibility that the noise is leaked out toward outside from the inner space of the vehicle body member, and it can be suppressed that any other electronic parts of the motor vehicle is affected by the noise generated from the motor and the electronic control unit.

On the other hand, since the seat belt retractor disclosed herein is formed to be compact and is able to be assembled into a narrow space such as the inner space of the center pillar or the like, an inner space of a vehicle interior of the motor vehicle can be prevented from being wastefully occupied by the seat belt retractor even when the seat belt retractor provided with the motor and the electronic control unit is provided in the motor vehicle. Thereby, a favorable restraining capability for an occupant can be obtained by a belt tension control for the seat belt by the motor, while securing comfort of the occupant in the vehicle interior.

Figure 4:
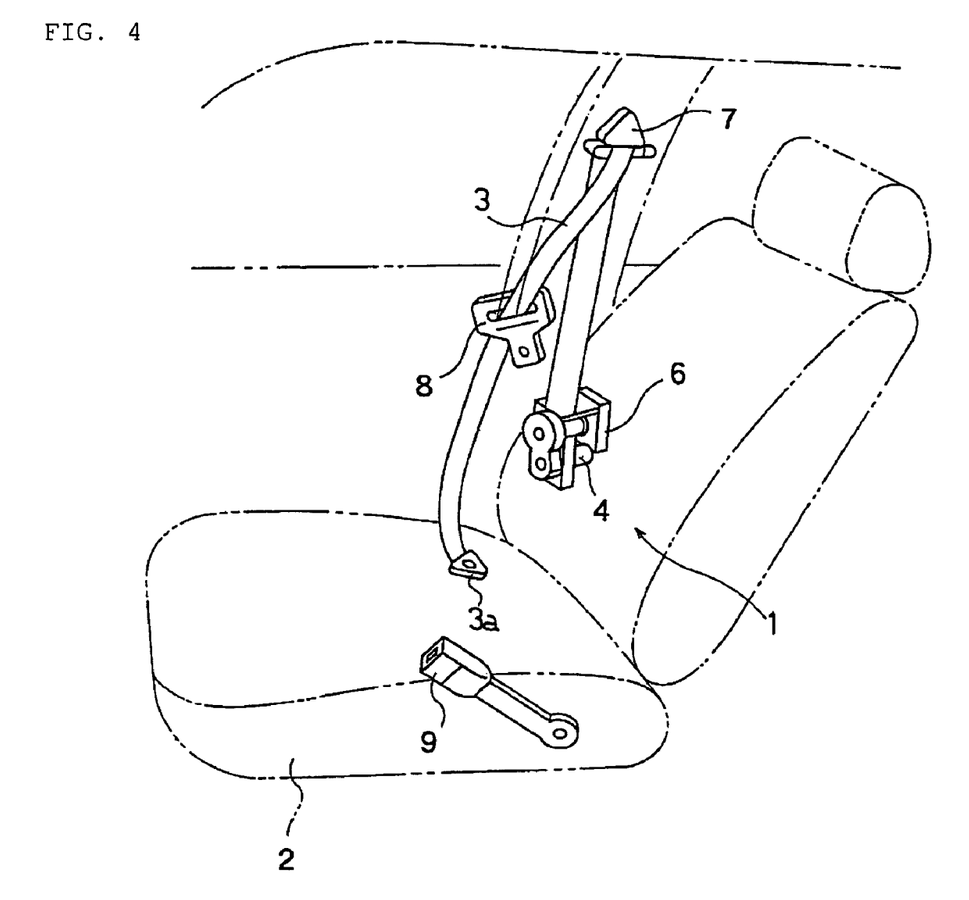
FIG. 4 is an illustration of a known seat belt apparatus.
Figure 5:
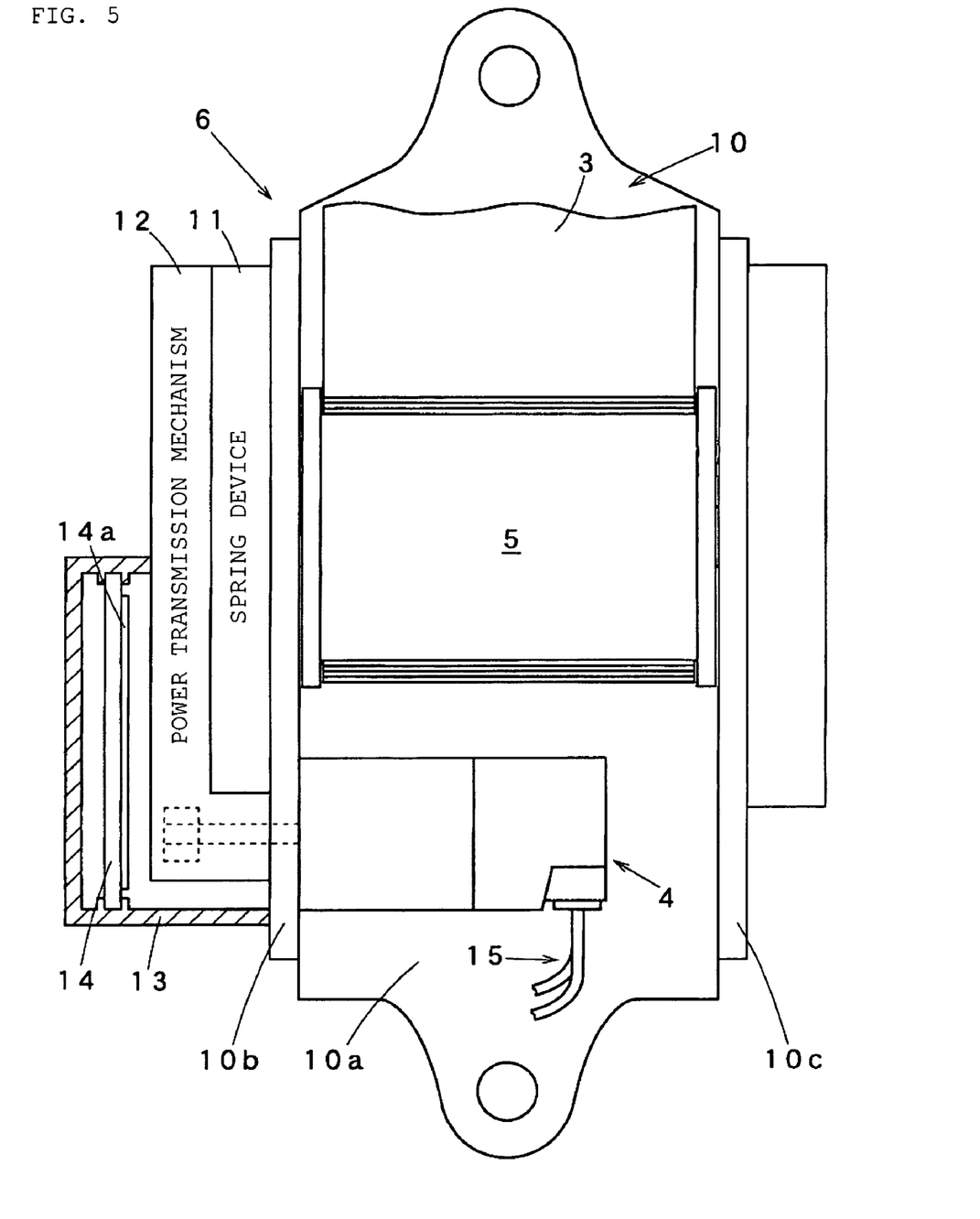
FIG. 5 is an illustration of a seat belt retractor used in a seat belt apparatus shown in FIG. 4.

As illustrated in FIG. 4 and FIG. 5, in a similar manner as that of a traditional three-point type seat belt apparatus, the seat belt apparatus 1 is composed of a seat belt 3 where a belt anchor 3a at a tip end thereof is fixed to a vehicle body floor or a vehicle seat 2, a seat belt retractor 6 fixed to a vehicle body and retracting the seat belt 3 by rotating a spool 5 by means of an electric motor 4, a guide anchor 7 for guiding the seat belt 3 being withdrawn from the seat belt retractor 6 toward a shoulder of the occupant, a tongue 8 slidably supported by the seat belt 3 that is guided from the guide anchor 7, and a buckle 9 fixed to the vehicle body floor or the vehicle seat 2, into which the tongue 8 is disengageably inserted and engaged.

In a similar manner as that of the known seat belt retractor, the seat belt retractor 6 in this example is provided with a C-shaped frame 10 including a back plate 10a, and both of left and right side walls 10b and 10c that are respectively protruded from both sides thereof, the seat belt 3, the spool 5 supported by the frame 10 for rotation for retracting the seat belt 3, a spring device 11 supported by the frame 10 and constantly biasing the spool 5 in a seat belt-retracting direction, the motor 4 serving as a driving device for rotating the spool 5 while being supported by the frame 10, a power transmission mechanism 12 supported by the frame 10, for transmitting a power of the motor 4 to the spool 5 upon converting the speed, and a circuit board 14 supported by a cover 13 provided on a side wall 10b at a left side of the frame 10 while including a printed circuit 14a for drive-controlling the motor 4. Further, the printed circuit 14a of the circuit board 14 is electrically connected to the motor 4 and a power source.

A known vehicle sensor (deceleration sensing mechanism) that is activated when predetermined deceleration or more is applied to the motor vehicle in a motor vehicle collision or the like, a known webbing sensor that is activated when the seat belt 3 is rapidly withdrawn at a speed higher than the normal speed of the seat belt being withdrawn (namely, the speed of the seat belt being withdrawn in wearing the seat belt, or the like), and a known locking mechanism for locking the rotation of the spool 5 in a seat belt-withdrawing direction, which is activated by the activation of any one of the vehicle sensor or the webbing sensor, are provided in the right side wall 10c of the frame 10.

Seat belt retractors are generally disposed in a limited narrow space inside a vehicle, such as a space inside a center pillar or the like. In this case, an opening for taking in and out the seat belt retractor is provided in a vehicle body member such as the center pillar or the like.

Although not referred to above, the circuit board 14 is integrally provided in the seat belt retractor 6, and is required to protect the circuit board 14 from an external force so that the circuit board 14 normally functions constantly.

Further, in the case that the circuit board 14 is integrally provided in the seat belt retractor 6, noise is sometimes generated from the motor 4 and the circuit board 14 due to that the circuit board 14 is activated when the motor 4 is driven. Accordingly, it is required that any of other electronic parts of the motor vehicle is not affected by the noise generated from the motor 4 or the circuit board 14.

Further, in the case that the circuit board 14 is integrally provided in the seat belt retractor 6, the strength of the frame 10 of the seat belt retractor 6 is required to be secured by just that much of the circuit board 14. However, if the strength of the frame 10 is attempted to be simply increased, the wall thickness of the frame 10 has to be increased or the structural size thereof has to be complicated and cumbersome. As a result, the seat belt retractor 6 is inevitably cumbersome. When the seat belt retractor 6 is of larger size, it becomes difficult to assemble the seat belt retractor 6 in the limited narrow space inside the motor vehicle such as the inner space of the center pillar or the like, in cooperation with that the seat belt retractor 6 becomes large sized by the circuit board 14 being integrally provided in the seat belt retractor 6.

Figure 1:
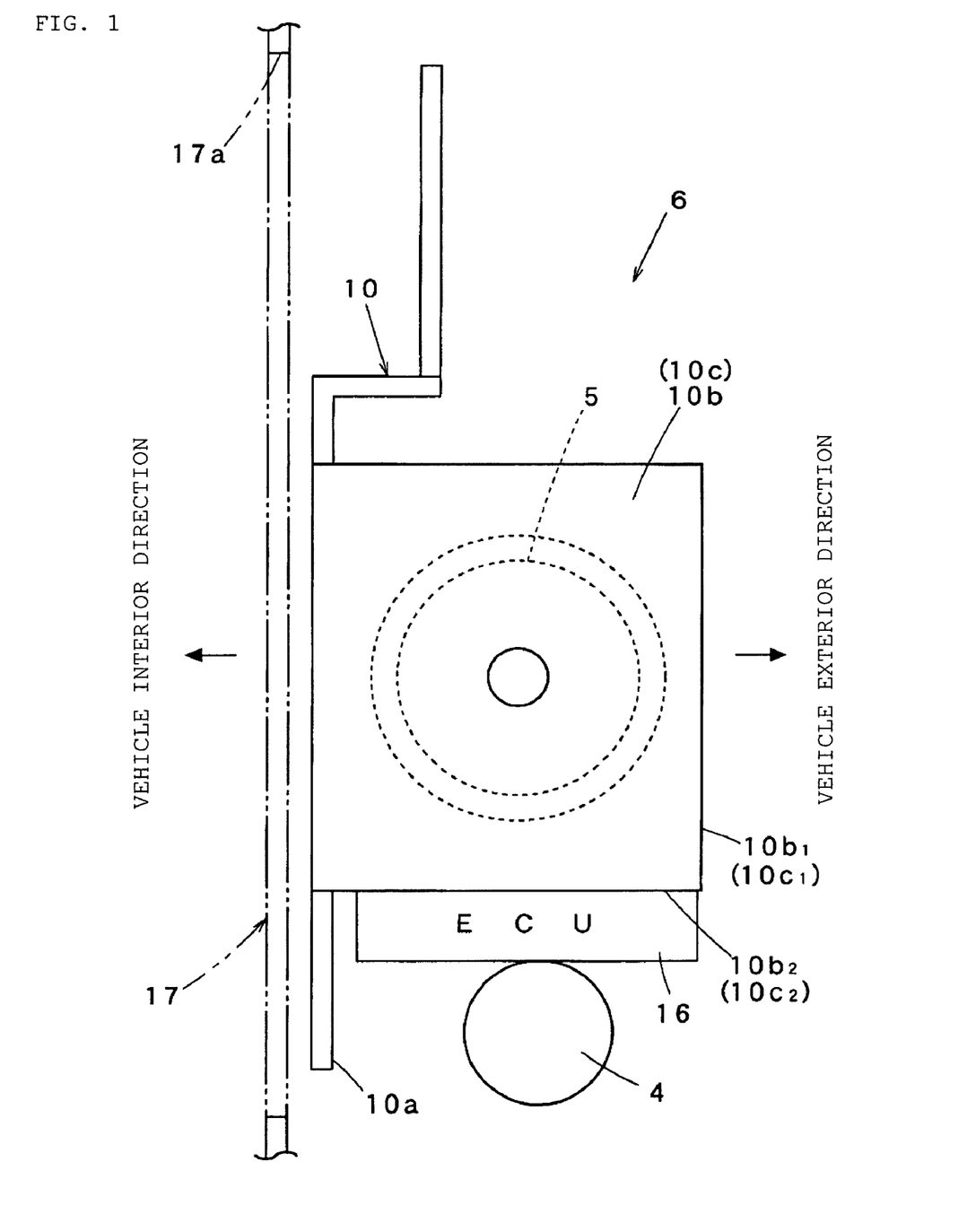
FIG. 1 is a an illustration of a first example of an embodiment of a seat belt retractor.

Reference will now be made to the figures. As illustrated in FIG. 1, a seat belt retractor 6 of the first example is provided with a metal-made C-shaped frame 10, and a spool 5 for winding a seat belt 3 while being supported by the frame 10 for rotation. Further, the seat belt retractor 6 is provided with an electric motor 4 for rotating the spool 5 in both a belt-retracting direction and a belt-withdrawing direction, and a flat plate-shaped electronic control unit (ECU) 16 for drive-controlling the motor 4. Accordingly, the seat belt retractor 6 of the first example is configured to perform both of retracting operation and withdrawing operation for the seat belt 3 by a driving force of the motor 4.

In this case, the ECU 16 is detachably installed between lower edges 10b2 and 10c2 of the respective both side walls 10b and 10c of the frame 10. Further, the motor 4 is detachably fixed to a lower surface of a case of the ECU 16. Since the motor 4 is provided on the case of the ECU 16, a length of wiring for an electric connection between the ECU 16 and the motor 4 can be shortened and the electric connection is constructed with ease. Thus, the motor 4 and the ECU 16 are integrally provided in the seat belt retractor 6.

Other construction of the seat belt retractor 6 of the first example is substantially the same as that of the above-described heretofore known example illustrated in FIG. 5.

The constructed seat belt retractor 6 of the first example is disposed at, for example, an inner space formed from a metal-made center pillar 17 (corresponding to a vehicle body member), namely a side of a vehicle exterior direction of the center pillar 17 in a manner such that the back plate 10a of the frame 10 faces a vehicle interior direction, as illustrated in FIG. 1. Thereby, most parts of the seat belt retractor 6 to which the ECU 16 is integrally assembled are covered with the center pillar 17. Moreover, the ECU 16 is configured to face the vehicle exterior direction in a state where the seat belt retractor 6 is assembled with the vehicle body. Accordingly, both the motor 4 and the ECU 16 are covered with the center pillar 17 and the back plate 10a of the frame 10, and are scarcely directly exposed to the vehicle interior side. The seat belt retractor 6 is taken in and out from the inner space of the center pillar 17 through an opening 17a of the center pillar 17.

According to the seat belt retractor 6 of the first example, since the ECU 16 is disposed between the frame 10 and the motor 4, the ECU 16 can be protected from an external force by the frame 10 and the motor 4.

Further, since the motor 4 and the ECU 16 are integrally formed, the electric connection between the ECU 16 and the motor 4 is further simplified and the length of the wiring therefore can be reduced, and thereby the number of assembling man-hours for assembling the motor 4 and the ECU 16 can be reduced. Furthermore, since both of the motor 4 and the ECU are disposed below both side walls 10b and 10c of the frame 10, dead spaces of both side walls 10b and 10c of the frame 10 can effectively be utilized for disposing the motor 4 and the ECU 16.

Furthermore, since both of the motor 4 and the ECU 16 being integrally provided are covered with the center pillar 17 and the back plate 10a of the frame 10, noise can be shielded by the center pillar 17 and the back plate 10a even when the noise is generated from the motor 4 and the ECU 16 due to the ECU 16 being activated at the time when the motor 4 is driven. Thereby, there is no possibility that the noise is leaked out toward outside from the inner space of the center pillar 17, and it can be suppressed that any other electronic parts of the motor vehicle is affected by the noise generated from the motor 4 or the ECU 16.

Moreover, since the ECU 16 is installed between the lower edges 10b2 and 10c2 of the respective both side walls 10b and 10c of the frame 10, the ECU 16 (particularly, a case of the ECU 16) can be utilized as a reinforcing member for the frame 10 in comparison with the case that the ECU 16 is provided on one of both side walls 10b and 10c. Thereby, the strength of the frame 10 can be secured without increasing the wall thickness of the frame 10 or forming the structural size of the frame 10 to be complicated and enlarged. Consequently, even when the ECU 16 is integrally assembled with the seat belt retractor 6, the seat belt retractor 6 can be formed to be lightweight and compact, and workability for assembling the seat belt retractor 6 into a limited narrow space inside the motor vehicle such as an inner space of the center pillar 17 or the like can be improved.

Other operation and advantages of the seat belt retractor 6 of the first example are substantially the same as that of the heretofore known seat belt retractor where the spool is driven by the motor.

Figure 2:
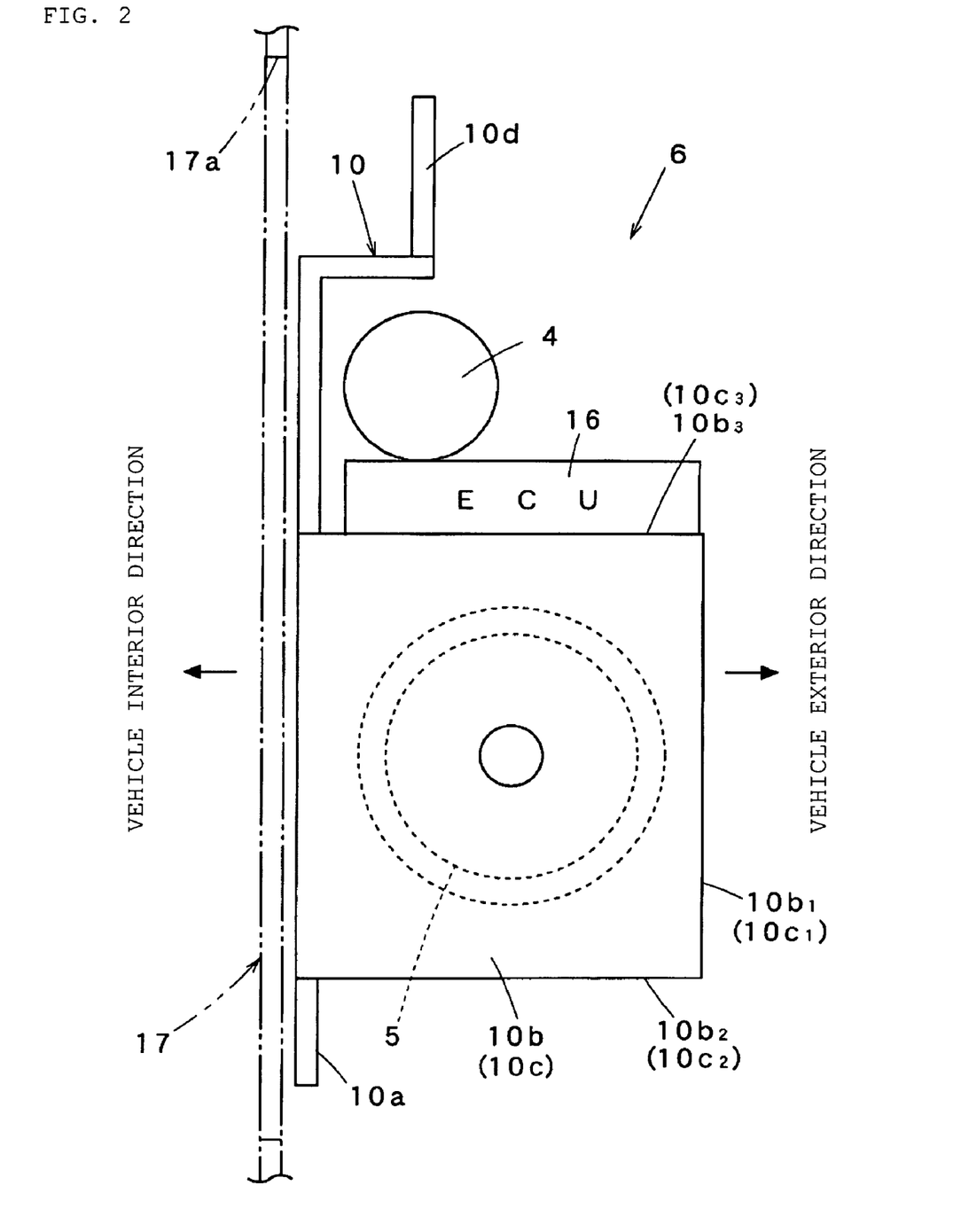
FIG. 2 is an illustration of a second example of the embodiment of a seat belt retractor.

Referring to FIG. 2 is an illustration of a second example of an embodiment of the seat belt retractor.

Although the ECU 16 is installed between the lower edges 10b2 and 10c2 of the respective both side walls 10b and 10c of the frame 10, and the motor 4 is fixed at a lower surface of the case of the ECU 16, in the above-described first example, the ECU 16 is installed between upper edges 10b3 and 10c3 of the respective both side walls 10b and 10c of the frame 10, and the motor 4 is fixed at an upper surface of the case of the ECU 16 in the seat belt retractor 6 of the second example, as illustrated in FIG. 2.

According to the seat belt retractor 6 of the second example, since the ECU 16 and the motor 4 are provided at an upper stay 10d side of the frame 10 to be attached to the to the vehicle body, the ECU 16 and the motor 4 can be placed closer to a vehicle body-attaching position of the seat belt retractor 6 for attaching the same to the vehicle body. Thereby, even when the ECU 16 and the motor 4 are integrally provided in the seat belt retractor 6, not only each weight of the ECU 16 and the motor 4 is dispersed to both side walls 10b and 10c, but also the same can be dispersed to the upper stay 10d side other than both side walls 10b and 10c.

Further, since the ECU 16 is surrounded by the back plate 10a, both side walls 10b and 10c, and the upper stay 10d of the frame 10, the ECU 16 can be protected from the external force by the back plate 10a, both side walls 10b and 10c, and the upper stay 10d.

Other construction, operation and advantages of the seat belt retractor 6 of the second example are the same as that of the above-described first example illustrated in FIG. 1.

Figure 3:
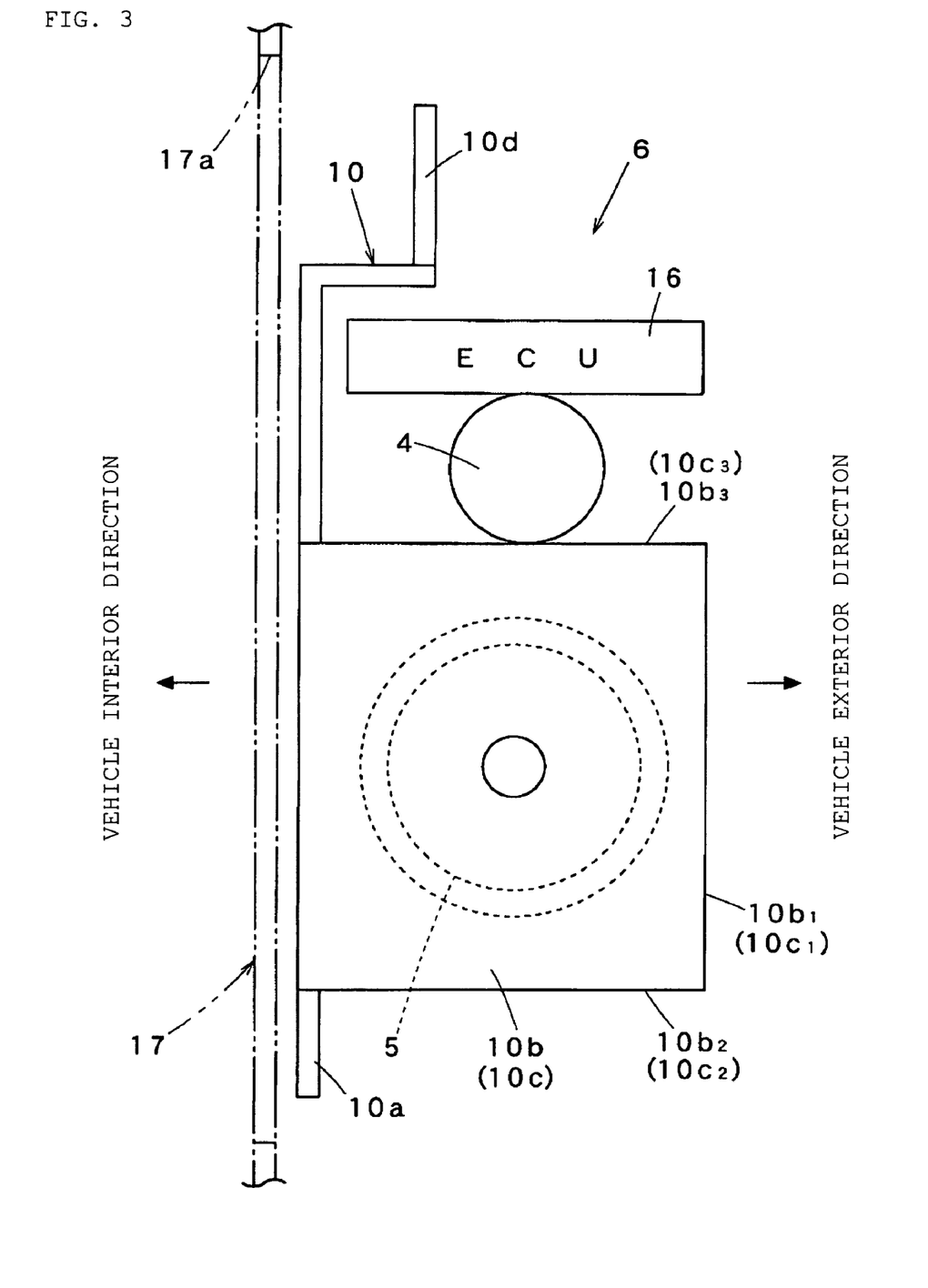
FIG. 3 is a an illustration of a third example of the embodiment of a seat belt retractor.

FIG. 3 is an illustration of a third example of an embodiment of the seat belt retractor.

Although the ECU 16 is installed between the upper edges 10b3 and 10c3 of the respective both side walls 10b and 10c of the frame 10, and the motor 4 is fixed to the case of the ECU 16 in the above-described second example, the motor 4 is installed between the upper edges 10b3 and 10c3 of both side walls 10b and 10c of the frame 10, and the ECU 16 is fixed to the upper surface of the case of the motor 4 in the seat belt retractor 6 of the third example, as illustrated in FIG. 3.

Other construction, operation and advantages of the seat belt retractor 6 of the third example are the same as that of the above-described second example illustrated in FIG. 2.

Incidentally, the seat belt retractor is not limited to the above-described examples, and the seat belt retractor can be configured to perform only the retracting operation for the seat belt by a driving force of the motor, or the same can also be configured to perform only the withdrawing operation for the seat belt by the driving force of the motor. That is, the seat belt retractor is configured to perform at least one of the retracting operation and withdrawing operation for the seat belt.

Further, any of the above-described respective seat belt retractors 6 of the first to third examples illustrated in FIG. 1 through FIG. 3 can be used for the seat belt retractor 6 in the heretofore known three-point type seat belt apparatus 1 illustrated in FIG. 4, for example.

As described above, according to the seat belt apparatus 1 provided with the seat belt retractor 6, since the seat belt retractor 6 is formed to be compact and is able to be assembled into a narrow space such as the inner space of the center pillar or the like as described above, an inner space of a vehicle interior of a motor vehicle can be prevented from being wastefully occupied by the seat belt retractor 6 even when the seat belt retractor 6 provided with the motor 4 and the ECU 16 is provided. Thereby, a favorable restraining capability for an occupant can be obtained by a belt tension control for the seat belt 3 through the motor 4, while securing comfort of the occupant in the vehicle interior.

The seat belt retractor and the seat belt apparatus can be preferably utilized for a seat belt retractor performing at least one of retracting operation and withdrawing operation for the seat belt by performing rotation control for a spool by a motor, and a seat belt apparatus provided with the same.

The priority application, Japanese Patent Application No. 2007-217908, filed Aug. 24, 2007 including the specification, drawings, claims and abstract, is incorporated herein by reference in its entirety.

It is important to note that the construction and arrangement of the seat belt retractor and seat belt apparatus as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the description. For example elements shown as integrally formed may be constructed of multiple parts or elements, the position of the elements may be reversed or otherwise varied, and the nature or number of discrete elements or positions may be altered or varied. Other substitutions, modifications, changes and omissions may be made in the design, operating conditions and arrangement of the exemplary embodiments.

What is claimed is:

1. A seat belt retractor comprising:
   a frame including a back plate and both side walls protruding from both side edges of the back plate;
   a spool for winding a seat belt while being supported by the frame for rotation;
   a motor for rotating the spool; and
   an electronic control unit for drive-controlling the motor, wherein the electronic control unit is detachably installed between one of upper edges and lower edges of the respective both side walls of the frame such that the electronic control unit abuts against the one of the upper edges and lower edges of the side walls when attached, and the motor is detachably fixed to one of an upper surface and a lower surface of the electronic control unit.

2. The seat belt retractor of claim 1, wherein the electronic control unit comprises an outer case, and wherein the motor is detachably fixed to one of an upper surface and a lower surface of the case of the electronic control unit such that the motor abuts against the case of the electronic control unit when attached.

3. A seat belt retractor comprising:
   a frame including a back plate and both side walls protruding from both side edges of the back plate;
   a spool for winding a seat belt while being supported by the frame for rotation;
   a motor for rotating the spool; and
   an electronic control unit for drive-controlling the motor, wherein the motor is detachably installed between upper edges of the respective side walls of the frame such that the motor abuts against the upper edges of the side walls when attached, and the electronic control unit is detachably fixed to an upper surface of the motor.

4. The seat belt retractor of claim 3, the electronic control unit is detachably fixed to the upper surface of the motor such that the electronic control unit abuts against the upper surface of the motor when attached.

5. A seat belt apparatus comprising:
   a seat belt retractor including a frame including a back plate and both side walls protruding from both side edges of the back plate; wherein the retractor further includes a spool for winding a seat belt while being supported by the frame for rotation and a motor for rotating the spool in order to perform at least one of a retracting and withdrawing operation for a seat belt, and an electronic control unit for drive-controlling the motor; wherein the electronic control unit is detachably installed between one of upper edges and lower edges of the respective both side walls of the frame such that the electronic control unit abuts against the one of the upper edges and lower edges of the side walls when attached, and the motor is detachably fixed to one of an upper surface and a lower surface of the electronic control unit;
   a tongue slidably supported by the seat belt that is withdrawn from the seat belt retractor; and
   a buckle with which the tongue is disengageably engaged, and wherein the apparatus is configured to restrain an occupant by the seat belt when the tongue is engaged with the buckle.

6. The seat belt apparatus of claim 5, wherein the seat belt retractor is disposed in a space inside a vehicle body member.

7. The seat belt apparatus of claim 5, wherein the electronic control unit comprises an outer case, and wherein the motor is detachably fixed to one of an upper surface and a lower surface of the case of the electronic control unit such that the motor abuts against the case of the electronic control unit when attached.

8. A seat belt apparatus comprising:
   a seat belt retractor including a frame including a back plate and both side walls protruding from both side edges of the back plate;
   wherein the retractor further includes a spool for winding a seat belt while being supported by the frame for rotation and a motor for rotating the spool in order to perform at least one of a retracting and withdrawing operation for a seat belt, and an electronic control unit for drive-controlling the motor; wherein the motor is detachably installed between upper edges of the respective side walls of the frame such that the motor abuts against the upper edges of the side walls when attached, and the electronic control unit is detachably fixed to an upper surface of the motor;
   a tongue slidably supported by the seat belt that is withdrawn from the seat belt retractor; and
   a buckle with which the tongue is disengageably engaged, and wherein the apparatus is configured to restrain an occupant by the seat belt when the tongue is engaged with the buckle.

9. The seat belt apparatus of claim 8, wherein the seat belt retractor is disposed in a space inside a vehicle body member.

10. The seat belt apparatus of claim 8, the electronic control unit is detachably fixed to the upper surface of the motor such that the electronic control unit abuts against the upper surface of the motor when attached.

* * * * *